United States Patent
Hong et al.

(10) Patent No.: US 11,520,119 B2
(45) Date of Patent: Dec. 6, 2022

(54) FOLDABLE LAPTOP COMPUTER CAMERA ACCESSORY

(71) Applicant: IPEVO, Inc., Sunnyvale, CA (US)

(72) Inventors: Royce Yu-Chun Hong, Taipai (TW); Mu Hau Kao, Taipei (TW)

(73) Assignee: IPEVO, INC., Sunnyvale, CA (US)

( * ) Notice: Subject to any disclaimer, the term of this patent is extended or adjusted under 35 U.S.C. 154(b) by 349 days.

(21) Appl. No.: 16/906,549

(22) Filed: Jun. 19, 2020

(65) Prior Publication Data

US 2021/0396952 A1   Dec. 23, 2021

(51) Int. Cl.
*G02B 5/08* (2006.01)
*G02B 7/182* (2021.01)
*G06F 1/16* (2006.01)

(52) U.S. Cl.
CPC .............. *G02B 7/182* (2013.01); *G02B 5/08* (2013.01); *G06F 1/1686* (2013.01)

(58) Field of Classification Search
CPC ......... G02B 7/182; G02B 5/08; G06F 1/1686; G03B 17/56; G03B 17/565; G03B 17/00
USPC ................................................... 361/679.55
See application file for complete search history.

(56) References Cited

U.S. PATENT DOCUMENTS

| 10,495,876 | B1 | 12/2019 | Dhindsa |
| 2011/0081946 | A1* | 4/2011 | Singh ................. H04M 1/0264 |
| | | | 359/857 |
| 2016/0188940 | A1 | 6/2016 | Lu et al. |

OTHER PUBLICATIONS

International Search Report and Written Opinion for International PCT Application No. PCT/US2021/03//34, dated Aug. 18, 2021.
Tweet from school teacher Tricia Louis in 2018. With the help of SeeSaw, an education app for teachers and students, she turned it into a tip for other teachers that are SeeSaw users.

* cited by examiner

*Primary Examiner* — Euncha P Cherry
(74) *Attorney, Agent, or Firm* — K&L Gates LLP (57) ABSTRACT

The present disclosure generally relates to an electronic device accessory and a method of using such electrical device accessory to convert a built-in camera or webcam of the electronic device into an adjustable camera using the mirror reflection, allowing the built-in camera or webcam to operate, for example, as a document camera. The electronic device accessory comprises at least a foldable main body and a mirror adapted to attach to the main body. The electronic device accessory is configured to clip onto the electronic device. The electronic device includes a desktop computer, a laptop computer, a mobile phone, a tablet, an e-reader or any other electronic device that has a built-in camera. More particularly, the electronic device accessory is preferably a foldable laptop computer camera accessory.

4 Claims, 9 Drawing Sheets

FOLDABLE LAPTOP COMPUTER CAMERA ACCESSORY

FIELD

The present disclosure generally relates to a foldable electronic device accessory and a method of using such electrical device accessory to convert a built-in camera or webcam of the electronic device into an adjustable camera using the mirror reflection, allowing the built-in camera or webcam to operate, for example, as a document camera. The electronic device accessory comprises at least a foldable main body and a mirror adapted to attach to the main body. The electronic device accessory is configured to clip onto the electronic device. The electronic device includes a desktop computer, a laptop computer, a mobile phone, a tablet, an e-reader or any other electronic device that has a built-in camera or webcam. More particularly, the electronic device accessory is preferably a foldable laptop computer camera accessory.

BACKGROUND

Currently, electronic devices such as computers, laptops, tablets or mobile phones are increasingly used for remote communications, distance learning and video conferences. Various forms of remote electronic communication with multimedia streams are known. Existing technologies allow a person to review a remotely located computer screen or a multimedia presentation in real time and also enable large number of people who are remotely participating in the communication or meeting via computers to view each other from the built-in cameras or webcams of their computers.

However, very often, the people participating in the meeting; are discussing details regarding a document or an object, or need to make a quick drawing or writing on a paper. The inability for a remotely located meeting participant to observe that document, object or drawing or writing on the paper disrupts the feeling of that participant that he is present in the meeting. As a result, the participants can feel disconnected, which decreases the perceived quality and/or effectiveness of the remote communications, distance learning and video conferences.

This feeling of "presence" is a central feature affecting the perceived remote communication and meeting experience of the participants. A "good meeting" may be one where the participants feel that they are able to discuss subject matters and view any documents or objects that an in-person meeting can provide. The lack of the feeling; of presence generally does not supplant the desire to meet in person to conduct business with another person or in-classroom learning. One existing solution to enable remote meeting participants to view details of a document or an object is to install and connect a document camera to the participants' computers. However, installing and connecting a document camera to each participant's computer is costly, complicated and not practical.

To address one or more of the disadvantages associated with remote communications, distance learning and video conferences discussed above, the present inventors identified there is a need for improved apparatus and methods to conduct remote communications, distance learning and video conferences between persons in different locations with more efficient remote interactions in an easy and economical way.

SUMMARY

In one aspect, the present disclosure provides a foldable electronic device accessory for use with an electronic device having a built-in camera or webcam to easily convert the built-in camera or webcam of the electronic device into an adjustable camera to allow the built-in camera or webcam to operate, for example, as a document camera to view a document or an object in details. The electronic device includes a desktop computer, a laptop computer, a mobile phone, a tablet, an i-pad, an e-reader or any other electronic device that has a built-in camera or webcam.

Disclosed and claimed herein is an electronic device accessory and a method of using such electronic device accessory to removably attach to the electronic device having a built in camera or webcam to convert the built-in camera or webcam of the electronic device into an adjustable camera to allow the built-in camera or webcam to operate, for example, as a document camera to view a document or an object in details.

In an aspect of the present disclosure, an electronic device accessory comprises at least a foldable main body having an upper section and a lower section; and a mirror adapted to attach to the lower section of the foldable main body, wherein the upper section and the lower section of the foldable main body are configured to attach together, the electronic device accessory is configured to removably attach to the electronic device, and the electronic device has a built-in camera or webcam.

In an embodiment, the electronic device includes a desktop computer, a laptop computer, a mobile phone, a tablet, an i-pad, an e-reader or any other electronic communication device that has at least one built-in camera or webcam. A non-limiting example of the electronic device is a laptop computer.

In an embodiment, the upper section of the foldable main body is pivotally connected to the lower section of the foldable main body, for example, using a mechanical hinge, a pivot pin or a crease.

In an embodiment, the foldable main body is one piece and further comprises a middle crease between the upper section and the lower section of the foldable main body, wherein the middle crease creates a living hinge upon which the upper and lower sections of the foldable main body are foldable at different foldable angles with respect to each other. In one embodiment, the foldable angle is from 0 to 180 degree.

In an embodiment, the foldable main body further comprises two side wings configured to attach to each side of the lower section of the foldable main body.

In an embodiment, the attachment of the two side wings to the foldable main body is pivotal connection through a mechanical hinge or a pivot pin.

In an embodiment, the two side wings each have rounded edges that prevent the electronic device accessory from scratching the surface of the display screen of the electronic device when being attached to the electronic device.

In an embodiment, the foldable main body is one piece further comprises two side creases between the two side wings and the lower section of the foldable main body, wherein the side creases create two living hinges upon which the two side wings of the foldable main body are foldable at different foldable angles with respect to the lower section of the foldable main body. In one embodiment, the foldable angles are from 0 to 180 degree.

In an embodiment, the upper section of the foldable main body comprises a cut-out plate and a corresponding cut-out hole, wherein the cut-out plate is adapted to attach to the upper section of the foldable main body and to fit into the corresponding cut-out hole.

In one embodiment, the attachment of the cut-out plate to the upper section of the foldable main body is through a mechanical hinge or a pivot pin.

In another embodiment, the cut-out plate and the upper section of the foldable main body are one piece, the cut-out plate is a cut out along three sides from the upper section of the foldable main body which creates a corresponding cut-out hole. In yet another embodiment, the foldable main body comprises a crease between the cut-out plate and the upper section of the foldable main body, wherein the creases create a living hinge upon which the cut-out plate is foldable at a foldable angle with respect to the upper section of the foldable main body. In another embodiment, the foldable angle is from 0 to 180 degree.

In another embodiment, the cut-out plate and the corresponding cut-out hole are in a rectangular shape.

In an embodiment, the foldable main body further comprises a fitting hole on the lower section of the foldable main body. In one embodiment, the cut-out plate can snap-fit into the fitting hole so the electronic device accessory can clip onto the electronic device.

In an embodiment, the foldable main body further comprises two locking holes on the upper section of the foldable main body; and two locking stubs on the two side wings, wherein each of the two side wings has one of the two locking stubs on an outside surface of the side wing, and wherein the two locking studs are adapted to removably snap-fit into the two locking holes to keep the electronic device accessory folded and closed when the electronic device accessory is not in use.

In an embodiment, the two locking holes are in circular, rectangular, triangular or any other shape, and the two locking stubs are in the corresponding circular, rectangular, triangular or any other shape such that the two locking stubs can be removably interlock with the two locking holes in order to keep the electronic device accessory folded and closed when the electronic device accessory is not in use.

In an embodiment, the main body of the electronic device accessory is one piece made from a polymer or a metal. In one embodiment, the main body is made from a polymer such as polypropylene (PP), polycarbonate (PC), acrylonitrile butadiene styrene (ABS), nylon (PA), and silicone. In another embodiment, the main body is made from a metal such as steel, aluminum and copper. In yet another embodiment, the main body is one piece preferably made from polypropylene (pp).

In an embodiment, the mirror is attached to the lower section of the main body through different ways, such as using a glue or a double-sided tape. Alternatively the lower section of the main body is configured for the mirror to be snapped into it and thus attach to it.

In an embodiment, the mirror is made from an acrylic glass such as poly(methyl methacrylate) (PMMA), polycarbonate (PC), silica-based glass, metal or any other reflective materials.

In an embodiment, the foldable main body includes multiple elements. One or more of the attachments between the upper and lower sections of the foldable main body, between the cut-out plate and the upper section of the foldable main body, and between the two side wings and the lower section of the foldable main body are pivotal connection, such as a connection using a hinge or a pivot pin between the two components.

In an embodiment, the upper section and the lower section of the foldable main body can be in any shape, such as a rectangular shape, a triangle shape, and a circular shape.

Preferably, the upper and lower sections of the foldable main body are in the same shape and the same size.

In an embodiment, an electronic device accessory for use with an electronic device comprising: 1) at least a foldable main body, wherein the foldable main body comprises an upper section; a lower section; two side wings on the lower section; a cut-out plate and a corresponding cut-out hole on the upper section; a fitting hole on the lower section; two locking stubs on two back surfaces of the two side wings; two locking holes on the upper section; a middle crease between the upper section and the lower section; two side creases between the two side wings and the lower section; a small crease between the cut-out plate and the upper section; and 2) a mirror adapted to attach to a front surface of the lower section of the foldable main body, the mirror has a reflective surface, wherein the foldable main body is one piece, the upper section is attached to the lower sections along the middle crease and is foldable to the lower section along the middle crease, the two side wings are foldable to the lower section along the two side creases, the cut-out plate is foldable to the upper section along the small crease, the cut-out plate on the upper section is configured to snap-fit into the fitting hole on the lower section for the electronic device accessory to clip onto the electronic device, the two locking stubs is configured to snap-fit into the two locking holes to close the electronic device accessory, and wherein the electronic device accessory is configured to removably attach to an electronic device and the electronic device has a built-in camera and a display screen.

In another aspect of the present disclosure, a method of using the electronic device accessory with an electronic device comprising: attaching the electronic device accessory to the electronic device having a built-in camera and a display screen; adjusting the electronic device accessory to sit at a position on top of the display screen and right above the built-in camera, wherein the mirror of the electronic device accessory is in front of the built-in camera and the reflective surface of the mirror faces the built-in camera; interlocking the cut-out plate into the fitting hole to clip the electronic device accessory onto the electronic device; adjusting the side wings of the electronic device accessory to form an desired angle between the reflective surface of the mirror and the display screen for the built-in camera to capture a maximum viewable area downward from the display screen using the mirror reflection; and viewing a document or an object on the maximum viewable area of the built-in camera.

In an embodiment, the desired angle between the reflective surface of the mirror and the display screen of the electronic device is from 0 to 90 degree, preferably from 10 to 80 degree, 20 to 70 degree, 30 to 60 degree, and more preferably from 40 to 50 degree. In one embodiment, the desired angle is about 45 degree.

In an embodiment, the electronic device includes a desktop computer, a laptop computer, a mobile phone, a tablet, an i-pad, an e-reader or any other electronic communication device that has at least one built-in camera or webcam. In another embodiment, the electronic device is a laptop computer.

In light of the disclosure and aspects set forth herein, it is accordingly an advantage of the present disclosure to provide an electronic device accessory and a method of using such electronic device accessory to convert the build-in camera or webcam of the electronic device to an adjustable camera to function, for example, as a document camera at low cost and quick and convenient way without any additional electrical apparatus such as an external document camera and without any complicated set up procedures.

Other aspects, features, and techniques will be apparent to one skilled in the relevant art in view of the following detailed description of the embodiments. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE DRAWINGS

The drawings accompanying and forming part of this specification are included to depict certain aspects of the present disclosure. A clearer conception of the present disclosure, and of the components and operation of systems provided with the present disclosure, will become more readily apparent by referring to the exemplary, and therefore non-limiting, embodiments illustrated in the drawings, wherein like reference numbers (if they occur in more than one view) designate the same elements. The present disclosure may be better understood by reference to one or more of these drawings in combination with the description presented herein. It should be noted that the features illustrated in the drawings are not necessarily drawn to scale. Understanding that figures depict only typical embodiments of the invention and are not to be considered to be limiting the scope of the present disclosure, the present disclosure is described and explained with additional specificity and detail through the use of the accompanying figures. The figures are listed below.

DESCRIPTION

One aspect of the disclosure relates to a foldable electronic device accessory for use with an electronic device having a built-in camera or webcam to convert the built-in camera or webcam to essentially function as a document camera without any additional electrical apparatus. Embodiments of the present disclosure will be described hereinafter with reference to the attached drawings.

Figure 1:
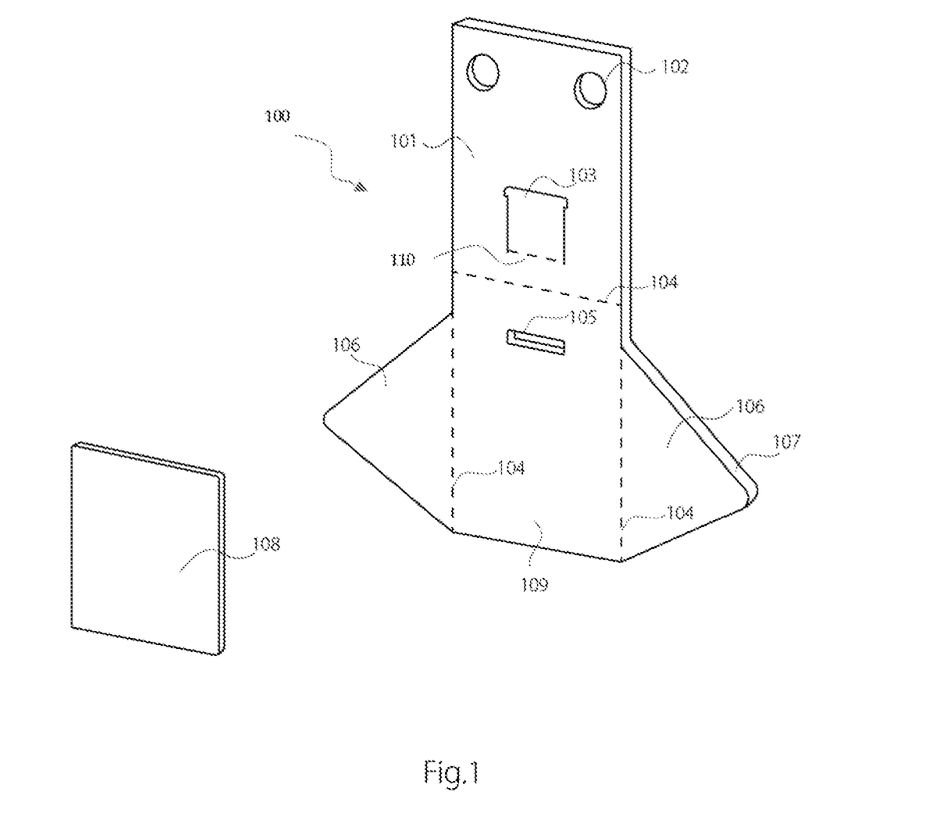
FIG. 1 is a perspective view of components of a foldable electronic device accessory before being assembled together, including a foldable main body 100 and a mirror 108 according to an embodiment of the present disclosure.

FIG. 1 is a perspective view of components of a foldable electronic device accessory before being assembled together, including a foldable main body 100 and a mirror 108 according to an embodiment of the present disclosure. The foldable main body is one piece made from a polymer such as polypropylene (PP), polycarbonate (PC), acrylonitrile butadiene styrene (ABS), nylon (PA) and silicone, and preferably PP in this embodiment. The mirror 108 is configured to attach to the foldable main body by different ways such as by a glue in this embodiment. The mirror 108 is made from an acrylic glass such as poly(methyl methacrylate) (PMMA), polycarbonate (PC), silica-based glass, metal or any other reflective materials.

Figure 2:
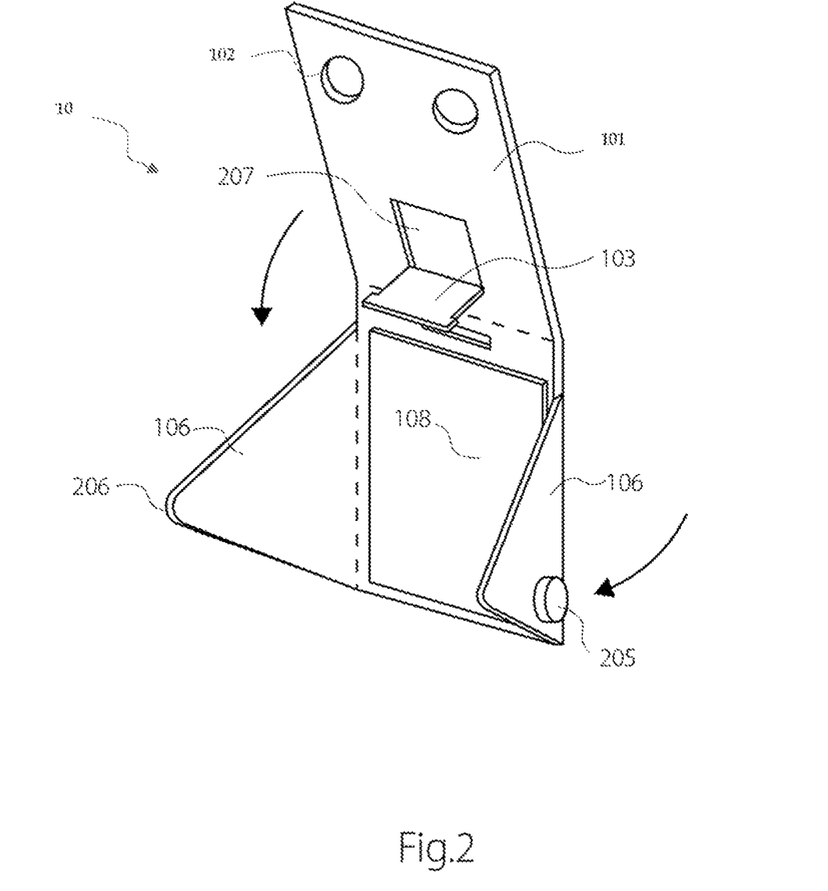
FIG. 2 is a perspective view of the electronic device accessory 10 with mirror 108 attached to the foldable main body 100.

Further referring to FIG. 1, the foldable main body includes an upper section 101, a lower section 109, a middle crease 104, two side wings 106 attached to the lower section 109, two side creases 104 between the two side wings 106 and the lower section 109, a cut-out plate 103 cut out from the upper section 101 and a corresponding cut out hole 207 (not shown in FIG. 1, see FIG. 2), a fitting hole 105 on the lower section 109, a small crease 110 between the cut-out plate 103 and the upper section 101, two locking holes 102 on the upper section 101, and two locking stubs 205 on the back surface of the two side wings 106 (not shown in FIG. 1, see FIG. 2). The middle crease and the two side creases 104 function as living hinges to facilitate the folding of the components of the foldable main body. The foldable main body 100 is foldable along the middle crease 104 so that the upper and lower sections (101, 109) form a foldable angle ranging from 0 to 180 degree. The two side wings 106 are foldable along the two side creases 104 with respect to the lower section 109 to form a foldable angle ranging from 0 to 180 degree. The cut-out plate 103 is foldable along the small crease 110 with respect to the upper section 101 to form a foldable angle ranging from 0 to 180 degree. The main body is one piece having a uniform thickness 107 from 0.1 mm to 30 mm, preferably from 0.5 to 20 mm, and more preferably from 0.5 to 10 mm. The thickness of the mirror is in the range from 0.1 to 5 mm, and preferably from 0.1 to 3 mm. As shown in FIG. 1, the electronic device accessory 10 is both simple, light weight, compact and self-contained for easy use, transportation and storage.

FIG. 2 is a perspective view of the electronic device accessory 10 with mirror 108 attached to the foldable main body 100. The mirror is attached to the front surface of the lower section 109 through a glue in this embodiment, but can be attached through any other ways. As shown in FIG. 2, the upper section 101 is folded to a certain angle with respect to the lower section 109, the cut-out plate 103 is folded to a certain angle with respect to the upper section 101, and the side wings 106 are folded with respect to the lower section 109 at certain angle. The two locking stubs 205 (only shown one in FIG. 2) are on the back surface of the two side wings 106. The two side wings 106 each have rounded edges 206 that prevent the electronic device accessory from scratching the surface of the display screen of the electronic device when being attached to the electronic device.

Further referring to FIG. 2, the cut-out plate 103 can be adjustably snap-fitted into the fitting hole 105 so the electronic device accessory 10 can be clip onto the display screen of the electronic device right on top of the built-in camera.

Referring again to FIG. 2, in order to fold and close the electronic device accessory 10, the user can first fold the two side wings 106 forward to the lower section 109; leave the cut-out plate 103 in the cut out hole 207; fold the upper section 101 to the lower section 109; and then close the electronic device accessory by snap-fit the two locking stubs 205 on the back surface of the two side wings 106 into the two locking holes 102 on the upper section 101 of the foldable main body. As shown in FIG. 2, the electronic device accessory 10 is there foldable and can be easily folded and closed for convenient transportation and storage when not being in use.

Figure 3:
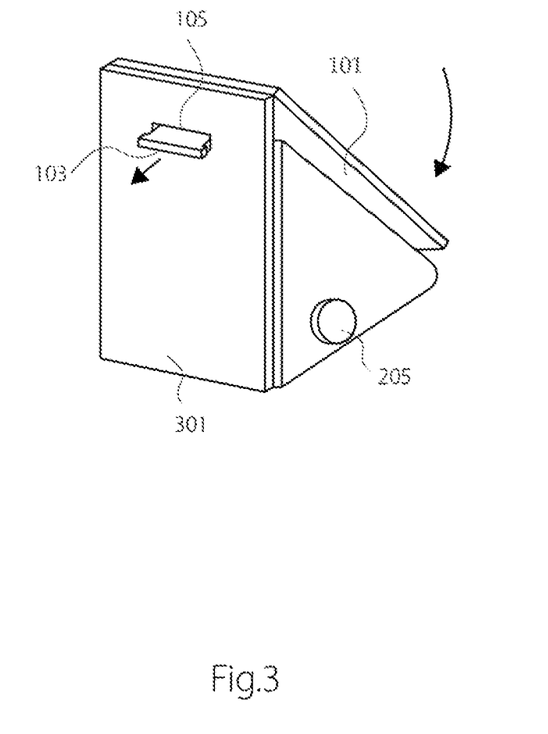
FIG. 3 is a back view of the electronic device accessory 10 as shown in FIG. 2 that is in a folded position when the electronic device accessory is clipped onto an electronic device display screen with adjustable angles.

FIG. 3 is a back view of the electronic device accessory 10 as shown in FIG. 2 in a position under use when the electronic device accessory 10 is clipped onto the display screen of the electronic device. The upper section 101 is folded forward to the lower section 109 so the cut-out plate 103 on the upper section 101 is adjustably snap-fitted into the fitting hole 105 on the lower section 109 at different depth to adjust the angle formed between the upper section 101 and the lower section 109. The component 301 is the back surface the lower section 109. The side wings can be adjustably folded to different angles so to fit the display screen of the electronic device of different thickness into the foldable electronic device accessory 10.

Figure 4:
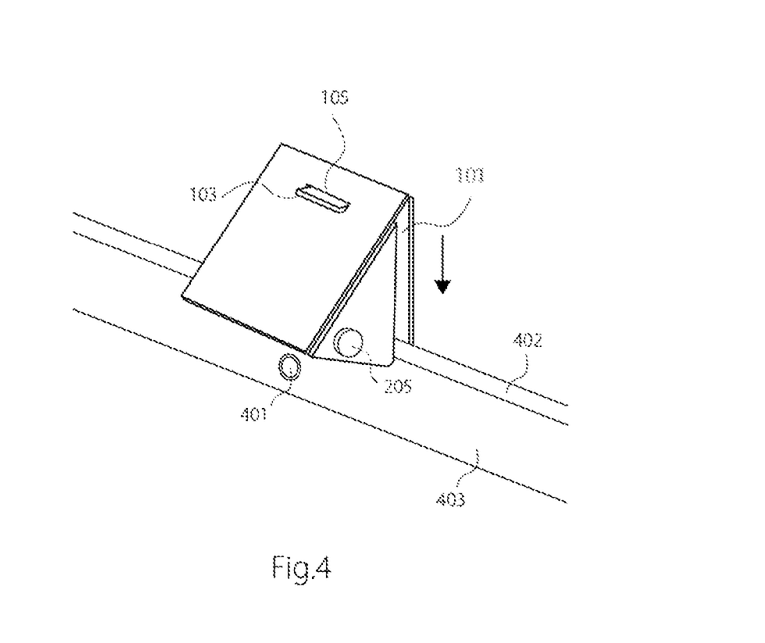
FIG. 4 is a view of the electronic device accessory 10 shown in FIG. 2 that clips on the display screen of an electronic device in front of the built-in camera.

FIG. 4 is a view of the electronic device accessory 10 shown in FIG. 2 that is clipped onto the display screen frame 403 of the electronic device in front of the built-in camera or webcam 401 of the electronic device by snap-fitting the cut-out plate 103 on the upper section 101 into the fitting hole 105 on the lower section 109. When the electronic device accessory 10 is clipped onto the display screen frame 403 of the electronic device, the upper section of the foldable main body is in the back of the display screen frame 403, the lower section 109 with the attached mirror 108 is in the front of the display screen. The reflective surface of the mirror 108 faces the built-in camera or webcam 401 of the electronic device. The depth of the cut-out plate 103 fitted into the fitting hole 105 can be adjusted to adjust the angle between the display screen and the reflective surface of the mirror 108 to a desirable angle. The desired angle between the display screen and the reflective surface of the mirror 108 is in a range from 0 to 90 degree, preferably 10 to 80 degree, more preferably 20 to 70 degree, 30 to 60 degree, and most preferably 40 to 50 degree. In an embodiment, the angle between the display screen and the reflective surface of the mirror 108 is about 45 degree.

As shown in FIG. 4, the two side wings can be folded forward toward the lower section 109 of the foldable main body at a desirable angle, so that the display screen of the electronic device with different thickness 402 can fit into the space between the upper section of the foldable main body and the two side wings and thus for the electronic device accessory 10 to clip onto the display screen frame 403 of the electronic device.

Figure 5:
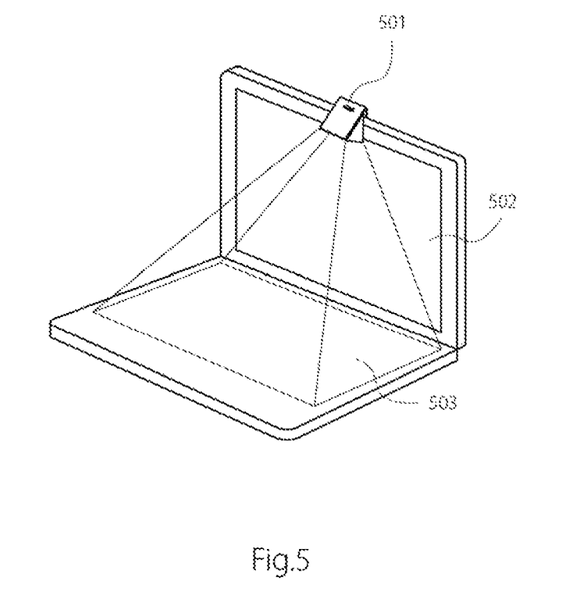
FIG. 5 is a view of the electronic device accessory 10 shown in FIG. 2 that clips on the display screen of a laptop computer in front of the built-in camera and the built-in camera or webcam 401 of the laptop computer has a viewable area 503.

FIG. 5 is a view of the electronic device accessory 10 shown in FIG. 2 that clips on the display screen frame of a laptop computer in a position 501 right above and in front of the built-in camera. The electronic device accessory 10 in this embodiment is essentially a foldable laptop camera accessory. As depicted in FIG. 4 and discussed above, the reflective surface of the mirror 108 on the lower section of the foldable main body 100 faces the built-in camera or webcam of the laptop. The electronic device accessory is adjusted to form a desired angle between the reflective surface of the mirror 108 and the display screen 502 of the laptop and thus enables the built-in camera or webcam 401 of the laptop computer to capture a maximum viewable area 503 using the mirror reflection of the mirror 108. The desired angle between the display screen and the reflective surface of the mirror 108 is in a range from 0 to 90 degree, preferably 10 to 80 degree, more preferably 20 to 70 degree, 30 to 60 degree, and most preferably 40 to 50 degree. In an embodiment, the angle between the display screen and the reflective surface of the mirror 108 is about 45 degree.

Figure 6:
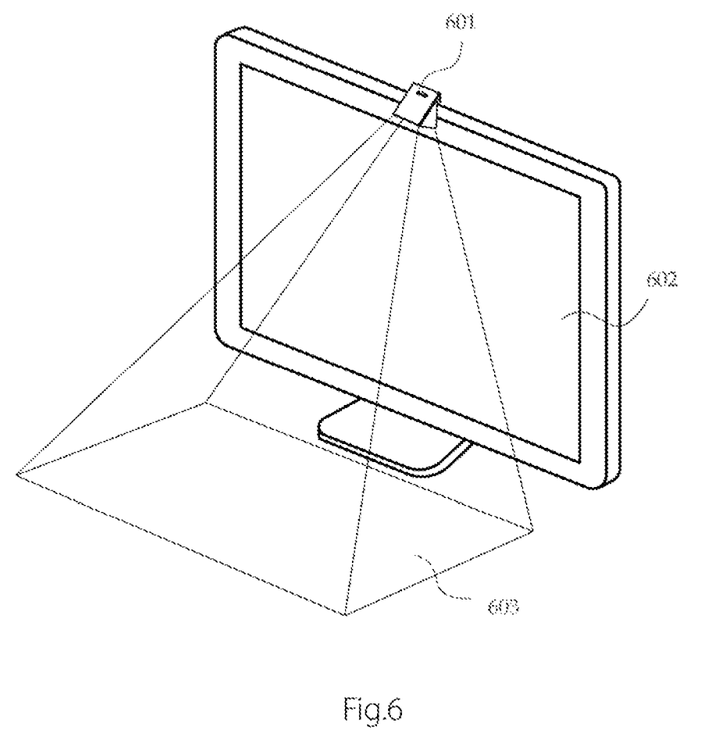
FIG. 6 is a view of the electronic device accessory 10 shown in FIG. 2 that clips on the display screen of a desktop computer in front of the built-in camera.

FIG. 6 is a view of the electronic device accessory 10 shown in FIG. 2 that clips on the display screen frame of a desktop computer in a position 601 right above and in front of the built-in camera or webcam. The electronic device accessory 10 in this embodiment is essentially a foldable desktop computer camera accessory. As depicted in FIG. 4 and discussed above, the reflective surface of the mirror 108 on the lower section of the foldable main body 100 faces the built-in camera or webcam of the desktop computer. The electronic device accessory is adjusted to form a desired angle between the reflective surface of the mirror 108 and the display screen 602 of the desktop computer and thus enables the built-in camera or webcam 401 of the desktop computer to capture a maximum viewable area 603 using the mirror reflection of the mirror 108. The desired angle between the display screen and the reflective surface of the mirror 108 is in a range from 0 to 90 degree, preferably 10 to 80 degree, more preferably 20 to 70 degree, 30 to 60 degree, and most preferably 40 to 50 degree. In an embodiment, the angle between the display screen and the reflective surface of the mirror 108 is about 45 degree.

Figure 7:
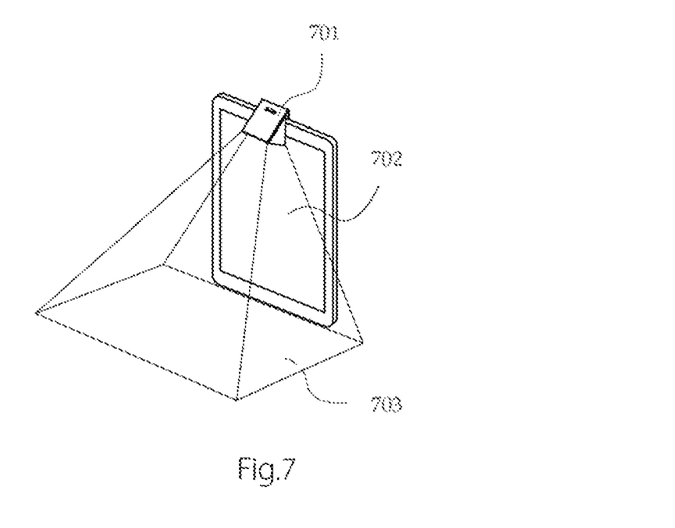
FIG. 7 is a view of the electronic device accessory 10 shown in FIG. 2 that clips on the display screen of a tablet in front of the built-in camera.

FIG. 7 is a view of the electronic device accessory 10 shown in FIG. 2 that clips on the display screen frame of a tablet in a position 701 right above and in front of the built-in camera or webcam. The electronic device accessory 10 in this embodiment is essentially a foldable tablet camera accessory. As shown in FIG. 4 and discussed above, the reflective surface of the mirror 108 on the lower section of the foldable main body 100 faces the built-in camera or webcam of the desktop computer. The electronic device accessory 10 is adjusted to form a desired angle between the reflective surface of the mirror 108 and the display screen 702 of the tablet and thus enables the built-in camera or webcam 401 of the tablet to capture a maximum viewable area 703 using the mirror reflection of the mirror 108. The desired angle between the display screen and the reflective surface of the mirror 108 is in a range from 0 to 90 degree, preferably 10 to 80 degree, more preferably 20 to 70 degree, 30 to 60 degree, and most preferably 40 to 50 degree. In an embodiment, the angle between the display screen and the reflective surface of the mirror 108 is about 45 degree.

Figure 8:
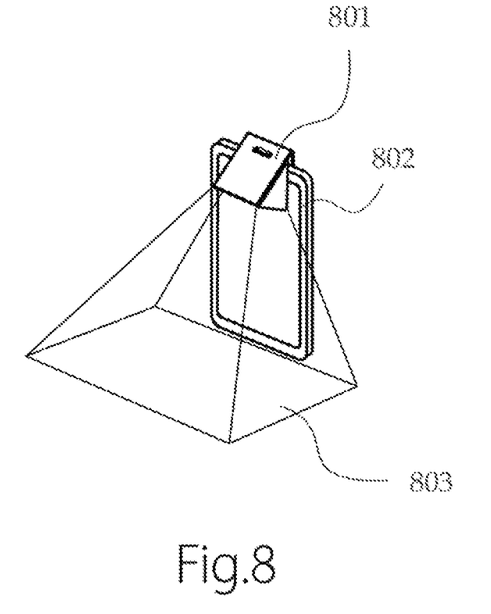
FIG. 8 is a view of the electronic device accessory 10 shown in FIG. 2 that clips on the display screen of an e-reader in front of the built-in camera.

FIG. 8 is a view of the electronic device accessory 10 shown in FIG. 2 that clips on the display screen frame of a smartphone in a position 801 right above and in front of the built-in camera or webcam. The electronic device accessory 10 in this embodiment is essentially a foldable smartphone camera accessory. As shown in FIG. 4 and discussed above, the reflective surface of the mirror 108 on the lower section of the foldable main body 100 faces the built-in camera or webcam of the smartphone. The electronic device accessory 10 is adjusted to form a desired angle between the reflective surface of the mirror 108 and the display screen 802 of the smartphone and thus enables the built-in camera or webcam 401 of the smartphone to capture a maximum viewable area 803 using the mirror reflection of the mirror 108. The desired angle between the display screen and the reflective surface of the mirror 108 is in a range from 0 to 90 degree, preferably 10 to 80 degree, more preferably 20 to 70 degree, 30 to 60 degree, and most preferably 40 to 50 degree. In an embodiment, the angle between the display screen and the reflective surface of the mirror 108 is about 45 degree.

Figure 9:
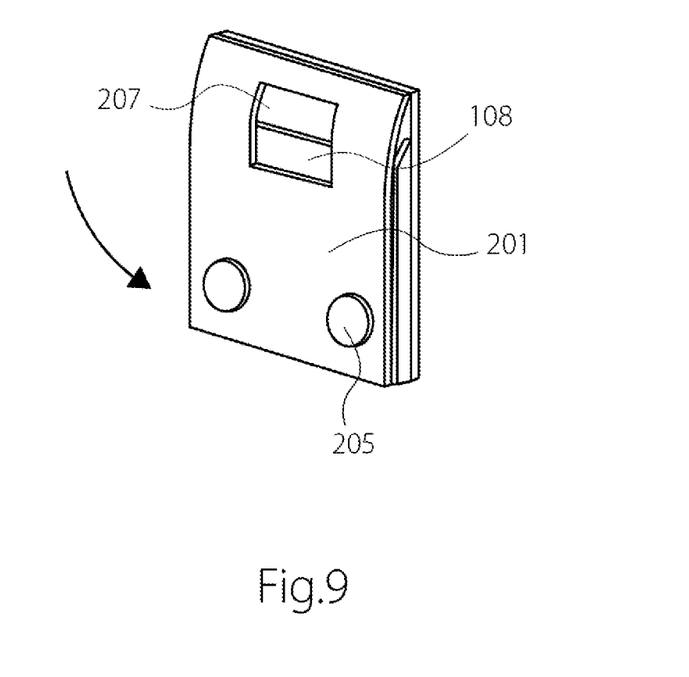
FIG. 9 is a view of the electronic device accessory 10 shown in FIG. 2 that is folded and closed when the electronic device accessory 10 is not in use.

FIG. 9 is a view of the electronic device accessory 10 shown in FIG. 2 that is folded and closed when the electronic device accessory 10 is not in use. When the electronic device accessory 10 is not in use, the user can simply fold and close the electronic device accessory 10 for easy transportation and storage. The user can first fold the two side wings 106 forward to the lower section 109; fold the cut-out plate 103 down to the upper section 101 of the foldable main body 100 (as shown in FIG. 9) or alternatively leave the cut-out plate 103 in the cut out hole 207 (not shown in FIG. 9); fold the upper section 101 to the lower section 109; and then close the electronic device accessory by snap-fit the two locking stubs 205 on the back surface of the two side wings 106 into the two locking holes 102 on the upper section 101 of the foldable main body 100. As shown in FIG. 9, the surface 201 is the back surface of the upper section 101 of the foldable main body 100. As shown in FIG. 9, the electronic device accessory 10 is there foldable and can be easily folded and closed for convenient transportation and storage when not being in use.

The examples and embodiments disclosed herein are to be construed as merely illustrative and not a limitation of the scope of the present disclosure in any way.

While this disclosure has been particularly shown and described with references to exemplary embodiments thereof, it shall be understood by those skilled in the art that various changes and modification in form and details may be made therein without departing from the spirit of the claimed embodiments. It is therefore intended that such changes and modifications be covered by the appended claims.

What is claimed is:

1. An electronic device accessory for use with an electronic device comprising:
    at least a foldable main body, wherein the foldable main body comprises an upper section; a lower section; two side wings on the lower section; a cut-out plate and defines a corresponding cut-out hole on the upper section and defines a fitting hole on the lower section; two locking stubs on two back surfaces of the two side wings; two locking holes on the upper section; a middle crease between the upper section and the lower section; two side creases between the two side wings and the lower section; a small crease between the cut-out plate and the upper section; and
    a mirror adapted to attach to a front surface of the lower section of the foldable main body, the mirror has a reflective surface,
    wherein the foldable main body is one piece, the upper section is attached to the lower sections along the middle crease and is foldable to the lower section along the middle crease, the two side wings are foldable to the lower section along the two side creases, the cut-out plate is foldable to the upper section along the small crease, the cut-out plate on the upper section is configured to snap-fit into the fitting hole on the lower section for the electronic device accessory to clip onto the electronic device, the two locking stubs is configured to snap-fit into the two locking holes to close the electronic device accessory, and wherein the electronic device accessory is configured to removably attach to an electronic device and the electronic device has a built-in camera and a display screen.

2. A method of using the electronic device accessory according to claim 1, the method comprising:
    attaching the electronic device accessory to the electronic device having a built-in camera and a display screen;
    adjusting the electronic device accessory to sit at a position on top of the display screen and right above the built-in camera, wherein the mirror of the electronic device accessory is in front of the built-in camera and the reflective surface of the mirror faces the built-in camera;
    interlocking the cut-out plate into the fitting hole to clip the electronic device accessory onto the electronic device;
    adjusting the side wings of the electronic device accessory to form an desired angle between the reflective surface of the mirror and the display screen for the built-in camera to capture a maximum viewable area downward from the display screen using the mirror reflection; and
    viewing a document or an object on the maximum viewable area of the built-in camera.

3. The method of claim 2, wherein the desired angle is from 30 to 60 degree.

4. The method according to claim 2, the electronic device is a desktop computer, a laptop computer, a mobile phone, a tablet, an i-pad, or an e-reader.

* * * * *